US006442602B1

(12) United States Patent
Choudhry (10) Patent No.: US 6,442,602 B1
(45) Date of Patent: Aug. 27, 2002

(54) SYSTEM AND METHOD FOR DYNAMIC CREATION AND MANAGEMENT OF VIRTUAL SUBDOMAIN ADDRESSES

(75) Inventor: Azkar Hussain Choudhry, Houston, TX (US)

(73) Assignee: Web and Net Computing, Houston, TX (US)

( * ) Notice: Subject to any disclaimer, the term of this patent is extended or adjusted under 35 U.S.C. 154(b) by 0 days.

(21) Appl. No.: 09/476,632

(22) Filed: Dec. 31, 1999

Related U.S. Application Data (60) Provisional application No. 60/138,815, filed on Jun. 14, 1999.

(51) Int. Cl.$^7$ .............................................. G06F 15/163
(52) U.S. Cl. ...................... 709/218; 709/222; 370/252
(58) Field of Search ................................ 709/105, 218, 709/220, 224, 227, 225, 226, 222, 232; 370/252, 103

(56) References Cited

U.S. PATENT DOCUMENTS

| 5,805,820 A | * | 9/1998 | Bellovin ..................... 709/225 |
| 5,944,790 A | * | 8/1999 | Levy .......................... 709/218 |
| 5,974,453 A | * | 10/1999 | Anderson et al. ........... 709/220 |
| 6,078,943 A | * | 6/2000 | Yu ............................. 709/105 |
| 6,157,618 A | * | 12/2000 | Boss et al. .................. 370/252 |

OTHER PUBLICATIONS

Request for Comments 1033, M. Lottor, SRI International, "Domain Administrators Operations Guide", published by InterNIC, Nov. 1987, 22 pages.

Request for Comments 1034, P. Mockapetris, ISI, "Domain Names—Concepts and Facilities", published by InterNIC, Nov. 1987, 55 pages.

Request for Comments 1035, P. Mockapetris, ISI, "Domain Names—Implementation and Specification", published by InterNIC, Nov. 1987, 55 pages.

Internet document, Apache Organization, "About the Apache HTTP Server Project", http://www.apache.org/ABOUT_APACHE.html, 4 pages, Feb., 1999.

Internet document, Apache Digital Corp., "Standard Server System", http://www.apache.com, 2 pages, Dec. 3, 1999.

Internet document, M. Faure., "Apache+SSL+PHP+FI+frontpage–howto", http://www.faure.de, 7 pages, Jul. 1998.

* cited by examiner

*Primary Examiner*—Ayaz Sheikh
*Assistant Examiner*—Khanh Quang Dinh
(74) *Attorney, Agent, or Firm*—Robert H. Frantz (57) ABSTRACT

An Internet domain name server platform which intercepts web browser HTTP queries to unrecognized, unregistered subdomain name and provides redirection of the query to a recognized and registered domain name or a subdirectory of a recognized and registered domain name. A server script is launched in response to the event of the request to an unrecognized subdomain name, which dynamically resolves the unknown address rather than returning a standard "Error 404: File Not Found" message to the requesting web browser. The script accesses a database of virtual subdomain names which are mapped in the database to actual subdirectories on the same or a remote server. For example, if a query to http://www.virtualsubdomain.domain.com is received, and virtualsubdomain.domain.com is not recognized as a registered domain name by the standard DNS server, the script will resolve it and map it to http://www.domain.com/subdomain, or any other file on a web server which is actually registered. Using this method, the creation of a virtual subdomain requires only the steps necessary to create a subdirectory. This enables it to be performed rapidly if handled manually, or it can be created automatically by any network client with privileges to create subdirectories on the web server in question.

12 Claims, 5 Drawing Sheets

Microfiche Appendix Included
(1 Microfiche, 70 Pages)

SYSTEM AND METHOD FOR DYNAMIC CREATION AND MANAGEMENT OF VIRTUAL SUBDOMAIN ADDRESSES

CROSS-REFERENCE TO RELATED APPLICATIONS

This application claims the benefit under 35 U.S.C. 119(e) of U.S. Provisional Application serial No. 60/138,815, filed on Jun. 14, 1999.

TECHNICAL FIELD OF THE INVENTION

This invention pertains to the arts of computer networks, addressing of computers on computer networks, and the administration and management of the addressing schemes. In particular, this invention relates to the arts of Internet Domain Name Servers; creation of Universal Resource Locators, Domain and Subdomain names; and management of virtual subdomains.

FEDERALLY SPONSORED RESEARCH AND DEVELOPMENT STATEMENT

This invention was not developed in conjunction with any Federally-sponsored contract.

MICROFICHE APPENDIX

A microfiche appendix consisting of 70 (seventy) frames on 1 (one) microfiche is submitted herewith, and its content is incorporated in its entirety into this specification.

BACKGROUND OF THE INVENTION

The Internet is possibly the greatest advance in information technology since the invention of the Gutenberg movable type printing press. It's impact on society worldwide has truly only been realized to a fraction of its ultimate potential. The Internet is not a single computer network, however, but is a hierarchy of many computer networks, all of which are interconnected by various types of server computers.

Key to success of the Internet is the addressing scheme which was adopted. The addressing scheme allows two types of addressing to be used when one computer transmits data to another computer over the Internet. The first addressing scheme, referred to as the Internet Protocol ("IP") address, is a numeric address value consisting of four binary octets separated by a period or "dot", such as AA.BB.CC.DD. Each of the octets is allowed to range in value from 0 to FF hexadecimal, or to 255 decimal. The values towards the left of the address, such as AA and BB, are referred to as network addresses and are used for coarse resolution of the address, while the values towards the right of the address are used for fine resolution of the address, such as CC and DD.

Figure 1:
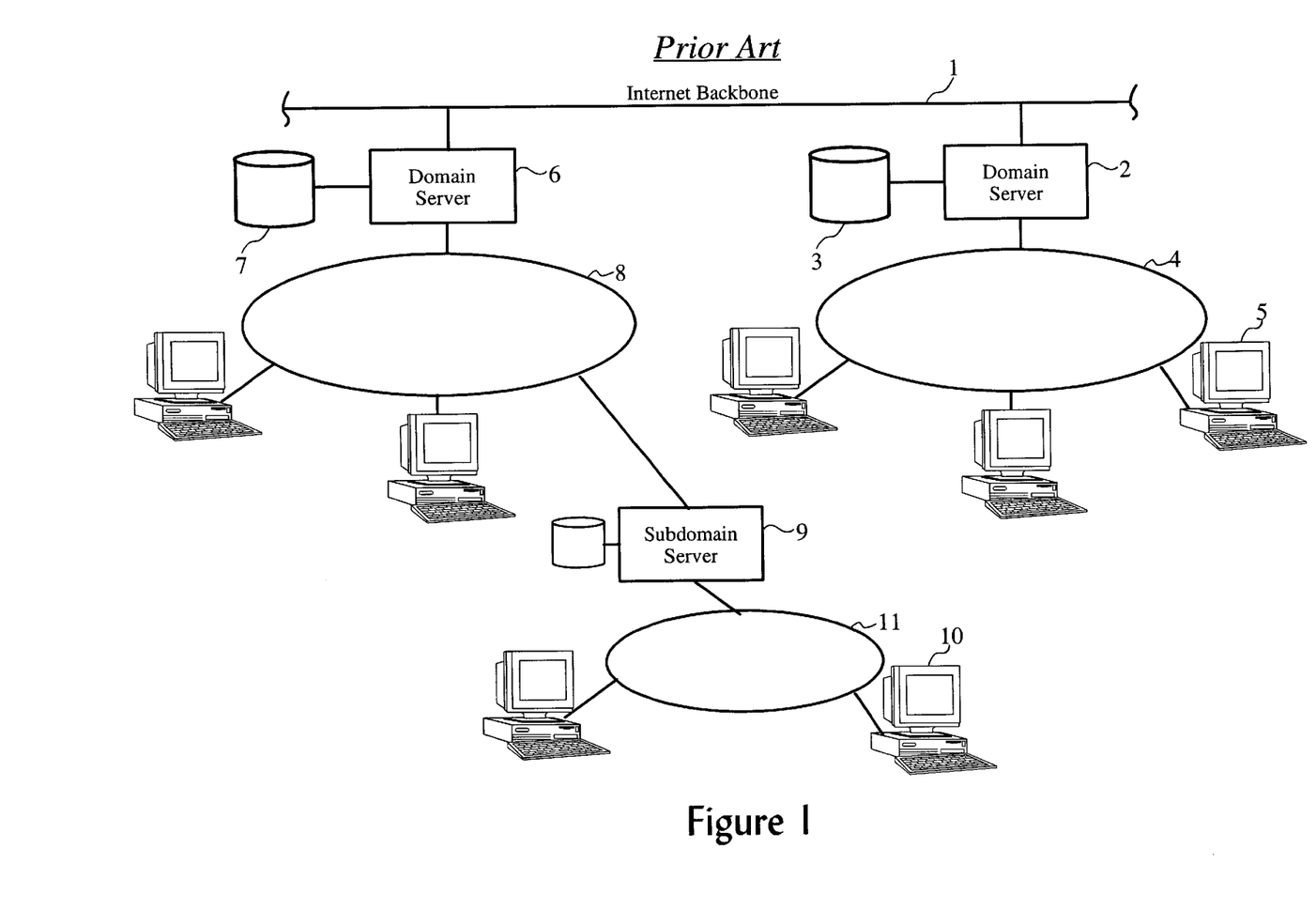
FIG. 1 presents the prior art arrangement of domain servers and subdomain servers in a computer network such as the Internet.

For example, turning to FIG. 1, the Internet backbone (1) is a set of high-speed data transmission facilities which interconnect several key switching and routing centers. Domain servers (2 and 6) may connect directly to the backbone (1), or they may connect indirectly to the backbone through other servers and other networks. For example, the domain server (2) on the right serves the subnetwork (4) on the right, which interconnects one or more client computers (5) to each other and to the Internet. Data or messages to be sent to any of the computers on the right-side network (4) must be properly addressed to be routed to them. For example, the right domain server (2) may be assigned a particular range or set of ranges of IP addresses to serve, such as 155.179.00.XX. A computer on the right-side network (4) may be given an address within this range, such as 155.179.00.213 (in decimal). A second computer on the right-side network (4) may be given an address such as 155.179.00.111. So, the octets towards the right of the IP address are subaddresses of the server's address. This scheme of addressing and subaddressing is well known within the art.

This subaddressing scheme is designed to allow subnetworking as well. For example, as shown in FIG. 1, the left-side domain server (6) may be assigned an IP address range of 98.99.YY.XX (in decimal). Computers directly connected to its subnetwork (8) would receive addresses within this range, as given in the previous example. However, another subnetwork (11), or sub-subnetwork to be literally correct, may be interconnected to the left-side network (8) via another domain server, which may be referred to as a subdomain server (9). This subdomain server may be given a range of IP addresses within the range of IP addresses for the left-side network domain server (6), such as 98.99.192.XX. The internetworking scheme of the Internet is built upon this hierarchical structure of networks and addresses.

The use of the term "domain" with respect to addressing actually implies more than the numeric IP addressing just discussed, in Internet parlance. While computers may deal well with numeric values for addressing, human users do not deal well with long numbers. When the architects of the early versions of the Internet, known as the ARPAnet, considered previous numbering schemes for humans, such as telephone numbers, they recognized this problem. In order to make the Internet more "user-friendly", a text-based addressing scheme was "overlaid" on top of the numeric IP addressing scheme. Thus, a hierarchy of text-based addresses was defined. At the top of the hierarchy is a domain, which in general a large range of IP addresses or group of addresses. For example, in FIG. 1, the right-side domain server (2) may be assigned an easy to remember domain name such as "uspto.gov". Under the Internet domain name convention, the extension of the name following the period or "dot" helps to categorize the type of domain. In this example, "gov" refers to government domains. Coupled with the domain name, "uspto", a particular domain server is addressed. Other extensions, such as "com" for commercial uses, "edu" for educational institutions and "net" for network services companies, are also available.

In order for messages and data to be actually routed to a computer using a domain name, a translation to a numeric IP address must be made. This is done by a number of distributed "domain name servers" ("DNS"), which can be queried by Internet routers to provide the translation. Each domain server maintains records regarding IP-to-domain name assignments for the domains which it serves. This translation technique and the protocol for updating records is described in the Internet Request For Comment ("RFC") papers, which are public documents available from InterNIC. Of particular interest are:

(a) RFC1033, Domain Administrators Operations Guide
(b) RFC1034, Domain Names—Concepts and Facilities, and
(c) RFC1035, Domain Name—Implementation and Specification.

These are public documents, and are well known within the art.

Continuing with the analogical structure to numeric IP addressing, domain names may be broken into two types of more resolute addresses. The first type is based upon directory structure of the file system on the server. For example, a subdirectory on the US Patent and Trademark Office's web server which contains general information might be named "gen info", and could be addressed as "www.uspto.gov/gen_info". Subnetworks and virtual subnetworks may be addressed by prefixing the general domain name with a subdomain name or names. For example, a subnetwork which serves only the trademark division of the US Patent and Trademark Office may be given the subdomain name "tm", allowing the subdomain server (such as 9 in FIG. 1) to be addressed as "tm.uspto.gov". The two addressing schemes can be combined, such as "tm.uspto.gov/gen_info", which would access a file named "gen_info.html" located in the root directory of the subdomain server for "tm" under the domain server for "uspto.gov". Alternatively, if a subdirectory called "gen_info" exists on the subdomain server "tm", a file named "index.html" may be accessed by a web browser which is pointed to this fill address.

Virtual subdomains are special cases of subdomains, which may or may not actually refer to a separate subdomain server from the domain server, but may refer to a directory or other software facility on the domain server. This is referred to as "hosting" the subdomain on the domain server. Later, if the owner of the subdomain desires, a separate subnetwork may be established with a separate subdomain server, and the routing tables on the domain server are updated to reflect a "pass through" routing to the new subdomain server.

The routing tables for domains, subdomains, sub-subdomains, etc., are typically implemented as simple text files stored on the disk subsystem of the various servers, such as the disk subsystems (7 and 3) shown in FIG. 1. To promote the easy interchange and exchange of routing definitions, RFC1033 defines standard formats for a record for each domain name and subdomain name, and recommends that these be stored in flat text files on each domain server's disk subsystem. These records are referred to as "resource records", or "RR" for short. Special records, referred to as "glue records", serve as pointers to other name servers which can fully resolve, or translate, a domain-subdomain address to a numeric IP address. These records on each name server define different "zones", which are subtrees of the address range or tree which the domain name server serves. These are particularly well defined in RFC1034 and RFC1035.

In operation, the address scheme is simple but time consuming. A network administrator, or "webmaster", is responsible for the manual configuration and maintenance of these records. At first glance, the task to create a new subdomain sounds simple, and is eloquently described as the following three steps on page 11 of RFC1033 Domain Operations Guide:

(1) Setup the new domain server and/or the new zone file,
(2) Add a Name Server record for each server of the new domain to the zone file of the parent domain, and
(3) Add any necessary glue Resource Records.

In reality, this may involve accessing physically or remotely the file systems of several servers, including log-on and password procedures. To be done correctly, some form of traffic engineering should be done to estimate the impact of adding a particular subdomain to the current name server with respect to the additional traffic or number of "hits" it will receive. The architecture implemented by the definitions and combinations of the domains and subdomains on specific server machines ultimately defines the performance and responsiveness of the network. Thus, not only do network administrators create new resource records when creating a new subdomain, but they also must continuously modify these records to optimize for ever-changing traffic patterns. A further drawback of the prior art process is that the creation of real subdomains has to be recognized and propagated by DNS servers throughout the Internet, a process that can take from 1 day to 2 weeks including administrative delays and 18 to 24 hours network propagation delay.

For these reasons, management and administration of subdomain names is quite time consuming in reality even though subdomains are an attractive option in various situations. So, while the addressing scheme is attractive from the user-interface perspective, it can be quite unattractive to the network planners due to the labor-intensive nature of operating the service.

Further, not all subdomain servers require dedicated and static IP addresses associated with their host names. Often, it is desirable to quickly create a sub-domain under the upper-level host domain name hierarchy so that different content can be published on the web which is more relevant to the subdomain name. An example would be "auctions.domain.com" to redirect the user to the "auctions" page under a more popular website called "www.domain.com". Similarly other areas may also need special and direct attention, such as "shopping.domain.com".

Therefore, there exists a need in the art for a system to quickly and efficiently create and manage subdomain names without extensive webmaster intervention. There is a need in the art for this system to be realizable on standard hardware and software platforms use for World-wide Web home page and domain name servers. Further, there is a need in the art for this new system and method to allow the virtual subdomains to be remotely located from the actual subdomain name server itself to enable the distribution of network server hardware resources and bandwidth demands.

SUMMARY OF THE INVENTION

The present invention modifies an existing domain name server platform in order to have it intercept all web browser queries to a higher level IP address, such as 157.6.7.xx, where "xx" is any value in the range of 1–254, or to any URL which is translated to fall within this IP address range. If the requested IP address or domain name is not recognized by the standard domain name server and the standard DNS database, a server script is launched to dynamically resolve the unknown address rather than returning a standard "Error 404: File Not Found" message to the requesting web browser. The script accesses a database of virtual subdomain names which are mapped in the database to actual subdirectories on the same or a remote server. For example, if a query to http://www.virtualsubdomain.domain.com is received, and virtualsubdomain.domain.com is not recognized as a registered domain name by the standard DNS server, the script will resolve it and map it to http://www.domain.com/subdomain, or any other file on a web server which is actually registered. Using this method, the creation of a virtual subdomain requires only the steps necessary to create a subdirectory. This enables it to be performed rapidly if handled manually, or it can be created automatically by any network client with privileges to create subdirectories on the web server in question.

BRIEF DESCRIPTION OF THE DRAWINGS

The figures presented herein when taken in conjunction with the disclosure form a complete description of the invention, wherein elements and steps indicated by like reference indicators are the same or equivalent elements or steps.

DETAILED DESCRIPTION OF THE INVENTION

The invention is preferably realized using an Apache HTTP (Hyper Text Transfer Protocol) Web Server as the basic platform. The Apache server is well known within the art, and is possibly the most popular web server used today. Many webmasters are capable of configuration and installation of such a server, and they can be readily obtained from companies such as Apache Digital Corporation of Durango, Colo.

Figure 2:
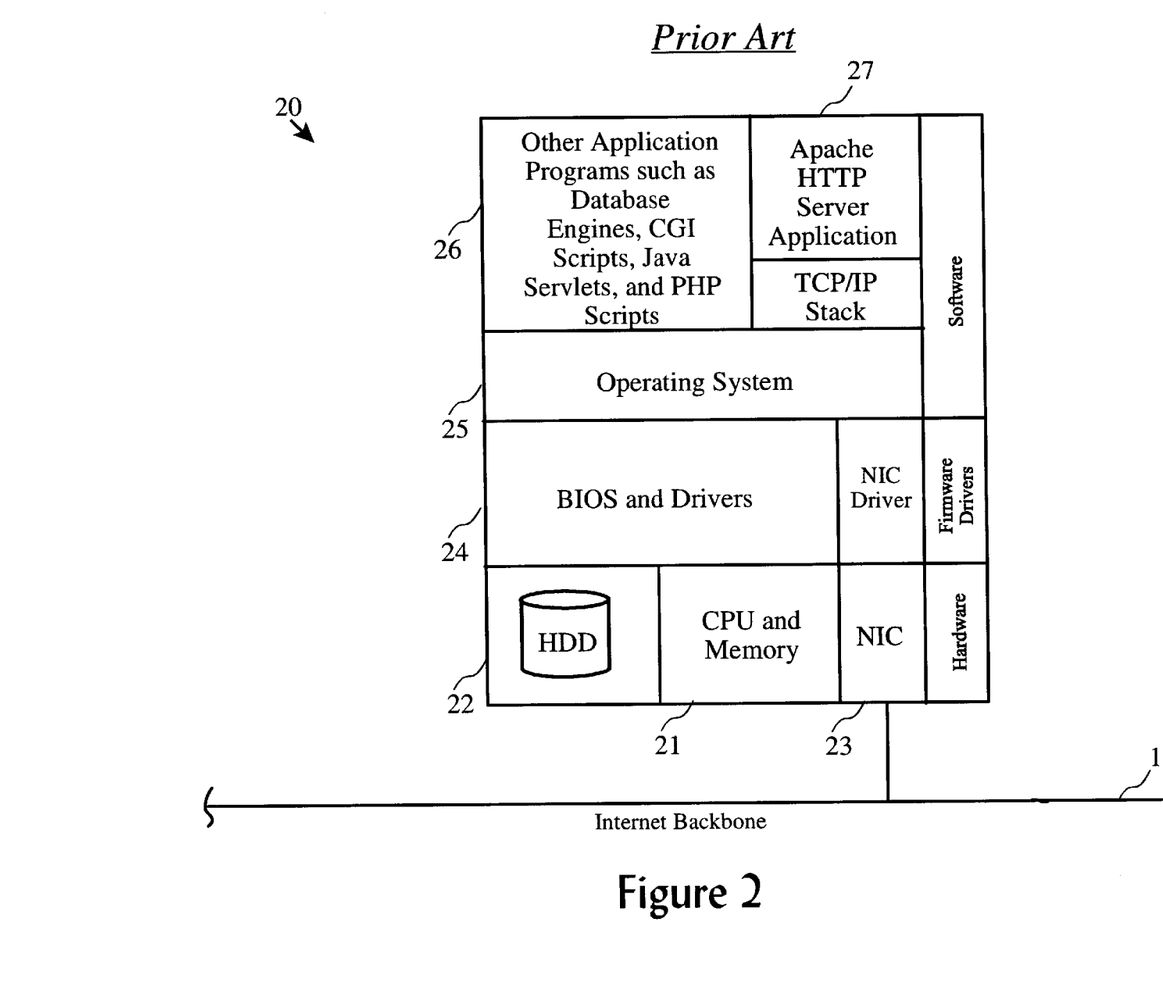
FIG. 2 shows the general architecture of an Apache HTTP server.

FIG. 2 shows the well known architecture of an Apache HTTP server. The server is a combination of a computer platform with specialized software. The computer platform generally consists of a central processing unit ("CPU") with memory (21), one or more hard disk drives ("HDD") (22), and a network interface card ("NIC") (23). This may be an IBM-compatible personal computer, as in the preferred embodiment, or Sun workstation or other suitable standard computer platform. A Basic Input/Output System ("BIOS") and set of low level driver firmware modules (24) typically interfaces the higher-level software to the hardware, including a NIC driver. An multi-tasking operating system ("OS") (25), such as Microsoft Windows NT, Linux, Unix or IBM OS/2, is also installed on the computer platform. Linux is the operating system of the preferred embodiment.

The Apache HTTP server software (27) is available for free download from the Apache Software Foundation at http://www.apache.org. It is an application program which interfaces to the Internet (1) through the NIC (23) and a Transmission Control Protocol/Internet Protocol ("TCP/IP") communications protocol stack. The TCP/IP stack may be native to the OS, or it may be supplied as a separate but compatible module with the Apache application and the OS. Other application programs (26) such as database engines, CGI scripts, Java servlets and PHP scripts may be executed on the same platform simultaneously to the Apache HTTP server application. PHP/FI is a scripting language that supports dynamic HTML pages. It is similar to Apache's SSI, but more complex and has database modules for the most popular databases. PHP/FI is a product of Iquest Internet of Indianapolis, Ind. In the preferred embodiment, the NIC is a 100BaseT local area network interface card, interconnected to the Internet (1) via one or more routers.

Figure 3:
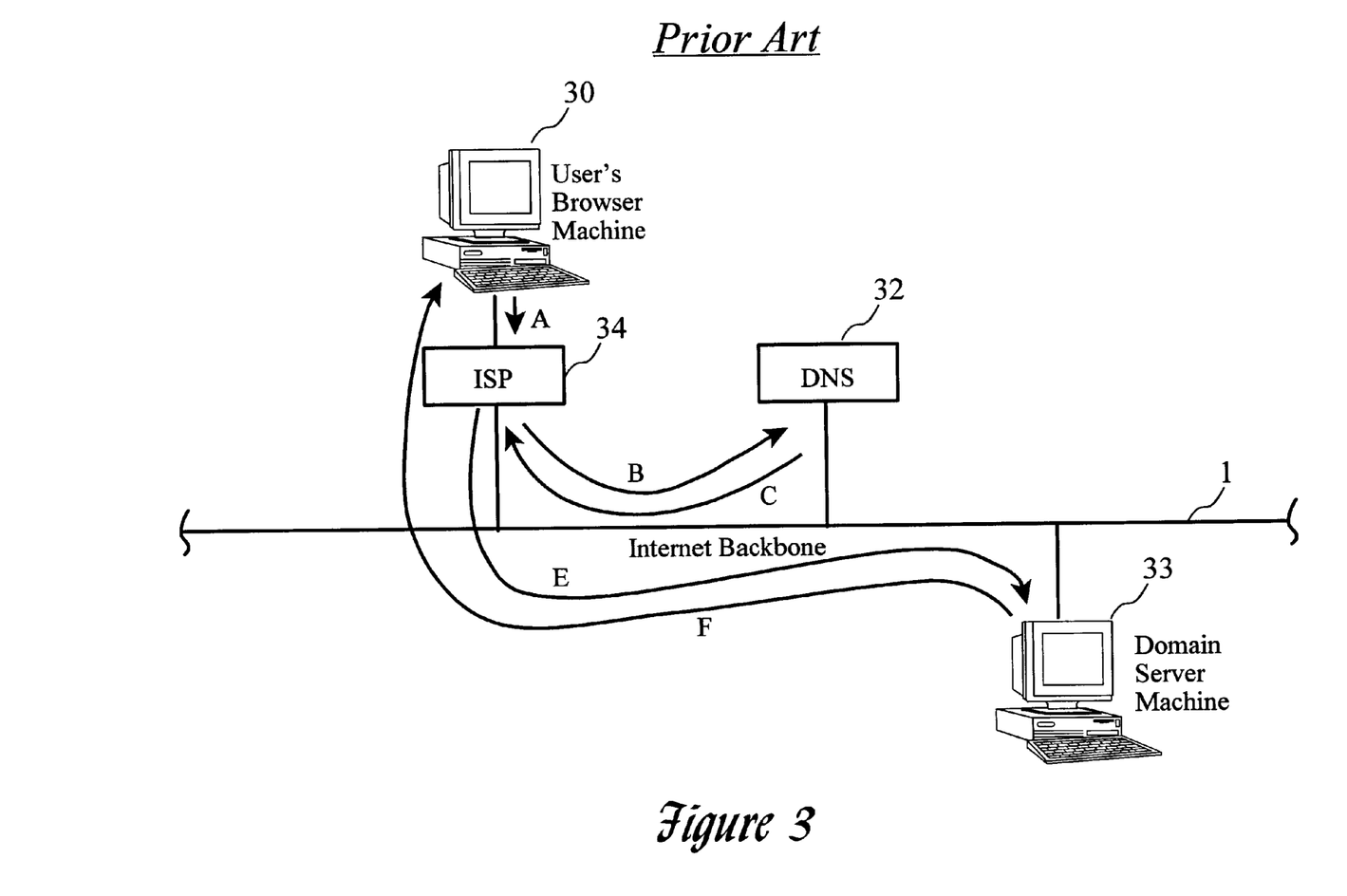
FIG. 3 depicts the basic communication process and arrangement between an Internet browser computer, an ISP, and domain name server, and a domain server.

FIG. 3 shows the well known arrangement of Internet browser computers, Domain Name Servers ("DNS"), Internet Service Providers ("ISP"), and domain servers. The internal architecture of domain name servers is fully described in RFC1035. In general, when a user selects a network address, such as "http://www.anycompany.com", in his web browser software, the browser machine (30) transmits a request (A) to the ISP (34). The ISP (34) then contacts (B) the DNS (32), which returns a translation (C) of the text-based URL to a numerical IP address value. The ISP (34) then requests (E) a document from the domain server (33) located at the IP address given by the DNS. The domain server (33) transmits (F) the document, typically in HTML, to the browser machine (30) via the ISP.

The first step of realizing the invention is to make a standard entry into the DNS routing table to send all URL requests for a range of addresses to a particular Apache HTTP web server. TABLE 1 shows such an example entry.

TABLE 1

| DNS Routing Table Entry | |
| --- | --- |
| www | aaa.bbb.ccc.3 |
| Alpha | aaa.bbb.ccc.4 |
| ns | aaa.bbb.ccc.2 |
| . | . |
| . | . |
| * | aaa.bbb.ccc.xxx |

This table indicates that if a web browser user selects the IP address aaa.bbb.ccc.3, he or she will be connected to the World Wide Web ("www") server. Likewise, if he or she types aaa.bbb.ccc.4, he or she will be connected to the server named "Alpha". To enable the invention, the final entry for "*" is made, which indicates that if the user types any other address in the Class 3 IP address range aaa.bbb.ccc, he or she will be connected to the server at IP address aaa.bbb.cc.xxx.

Figure 4:
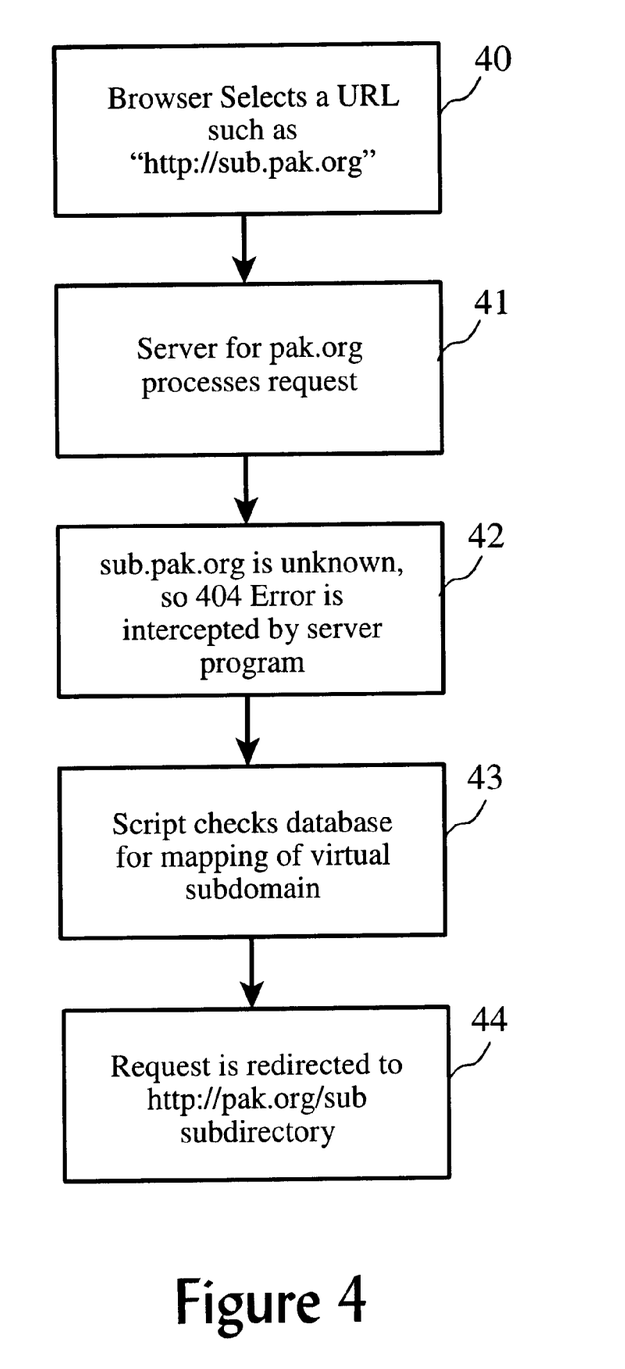
FIG. 4 illustrates the steps of redirection of a virtual subdomain to a real subdirectory.

Further, a script is installed on the Apache HTTP server to intercept the queries to unknown URL's, as defined by the "*" entry in the routing table. For example, if a web browser requests a URL such as "http://subdomain.domain.com", and it is not recognized by the standard DNS, the Apache server will typically return a "Error 404: File Not Found" page to the web browser. FIG. 4 shows the basic operation of the redirection of the virtual subdomain to a true subdirectory. As shown in FIG. 4, when a web browser requests (40) a URL, it is processed (41) normally by the Apache HTTP server. When it is not recognized (42), it is passed to the script. The script then queries (43) a database of virtual subdomain mappings, and redirects (44) the request to the appropriate subdirectory on a registered domain server. This process occurs without the web browser user being aware of it, and thus gives the user the impression that the subdomain actually exists.

Figure 5:
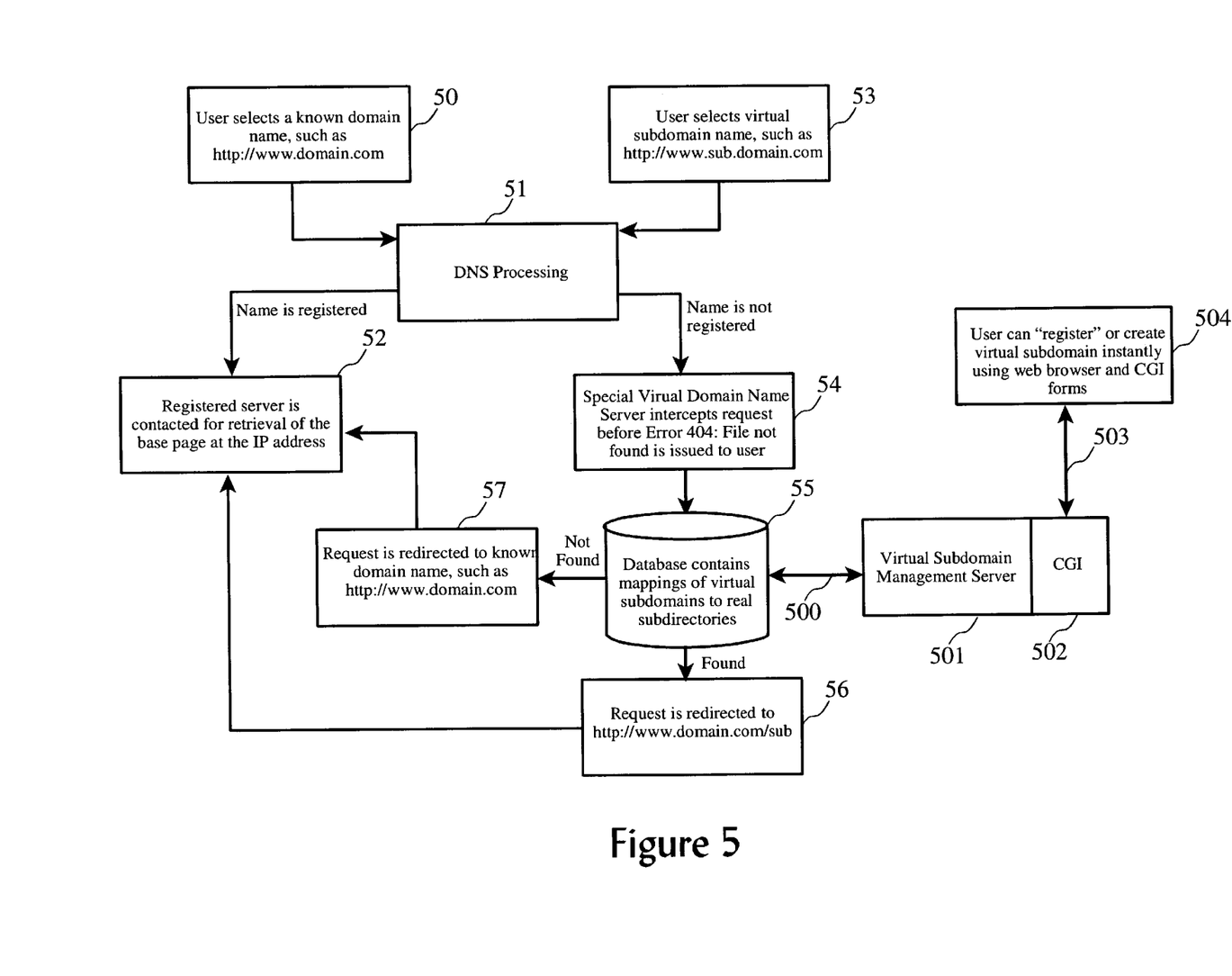
FIG. 5 presents in detail the process of handling virtual subdomains, real domains and subdomains, and non-existing subdomains.

FIG. 5 shows in more detail the functional flow of the virtual subdomain service which is enabled by the script on the modified Apache HTTP server. If a user selects (50) a known and registered URL, such as http://www.domain.com, the DNS recognizes (51) it in the standard DNS database, and directs the connection to the world-wide web server for that domain name (52). The same process occurs for recognized subdomains. However, if the user selects (53) a virtual subdomain name, such as http://www.sub.domain.com, the standard DNS server will direct the request to the special virtual subdomain server (54) due to the "*" entry in the routing table.

The script on the virtual subdomain server (54) then parses the requested URL for the domain and subdomain names, in the example the domain name is "domain" and the virtual subdomain name is "sub". The virtual domain name server then queries a database (55) for a mapping to a subdirectory for the virtual subdomain. If there is a matching entry, such as "/sub", the request is redirected (56) by the script to a subdirectory on the registered domain server (52) by concatenating the domain name and the subdirectory name, such as "http://www.domain.com/sub". If no mapping record is found, the script simply redirects (57) the request to the valid registered domain server address, such as "http://www.domain.com". In either case, the user does not receive the typical "Error 404: File not found" response which is a common problem in the current technology. Also, the destination web server and subdirectory may be local to the special virtual subdomain server, or remote, thereby allowing virtual subdomains to be hosted anywhere on the Internet by any web server.

To manage the virtual subdomains, the special subdomain database (55) can be edited manually using an administrator's interface to the database. Such manual database record creation is well known within the art. However, in order to allow web browser users to dynamically and instantly create virtual subdomains without waiting for official a registration processes to complete, a special virtual subdomain management server (501) is installed on the Internet. This is a standard web server, including hardware platform such as an Intel-based computer, running a web-server package, such as Apache HTTP server, and a suitable OS. It may be integrated with the special virtual subdomain name server (54, 55, and 56), or configured separately. In the preferred embodiment, a Common Gateway Interface ("CGI") script (502) is used to transmit forms to the web browser (504) via the Internet connection (503) between the virtual subdomain management server (501)and the user's web browser. The forms allow the web browser user to select the name for his or her new virtual subdomain, to enter the domain name with subdirectory to which requests for the virtual subdomain should be redirected, and any other user information necessary to establish an account such as name, e-mail address, billing address, telephone number, etc. Through the CGI interface, the virtual subdomain management server (501) collects the information and creates a new record in the virtual subdomain mapping database (55) through a database application programming interface ("API") (500). If the virtual subdomain management server is integrated with the virtual subdomain name server, this may be a simple database API call. However, if the virtual subdomain management server is networked to the virtual subdomain name server, a secure protocol to the database should be used to avoid unauthorized modification of the virtual subdomain mapping database.

While the disclosure contained herein has set forth a preferred embodiment of the invention, and the fundamental components used within the invention are well known within the art, it will be appreciated by those who are skilled in the art that variations to the combination of elements and steps disclosed can be made without departing from the scope and spirit of the invention. Such variations may include, but are not limited to, selection of alternate web server hardware platforms, operating systems, and HTTP server suites, as well as implementation of the process as a servlet or other program embodiment.

What is claimed is:

1. A method for redirecting an Internet subdomain address request to a virtual subdomain on an Internet domain name server, comprising the steps of:

receiving from an Internetworked client computer a request for an Internet document at an unrecognized unregistered subdomain address;

executing a redirection script on said domain name server in response to said request for said unrecognized unregistered subdomain address;

accessing a computer-readable record by said script to determine a subdirectory or recognized and registered domain name assigned to said unrecognized unregistered subdomain; and redirecting said request to said subdirectory or recognized and registered domain name such that said request results in a request to a recognized domain name or to a subdirectory of a recognized domain name on a web server, thereby allowing the request to be fulfilled by said web server which hosts the recognized domain name or subdirectory of the recognized subdomain name.

2. A method for redirecting an Internet subdomain address request to a virtual subdomain on an Internet domain name server as set forth in claim 1, wherein said step of accessing a computer readable record further comprises accessing a computer database.

3. A method for redirecting an Internet subdomain address request to a virtual subdomain on an Internet domain name server as set forth in claim 1 further comprising the step of providing an entry in a routing table for a domain name server, said entry allowing a range of addresses to be handled by said domain name server thereby allowing redirection of a range of unrecognized subdomain names by a domain name server.

4. A method for redirecting an Internet subdomain address request to a virtual subdomain on an Internet domain name server as set forth in claim 1 wherein said step of executing a redirection script further comprises executing a redirection script by intercepting a "File not found" error on a domain name server.

5. An Internet virtual subdomain name server for providing Internet address management for unregistered and unrecognized subdomains, said virtual subdomain name server comprising:

an Internet domain name server computer platform including a central processor unit capable of executing software, an operating system executed by said central processor unit and managing a plurality of multiple applications and tasks simultaneously, a computer network interface communicable to an Internet allowing said applications and tasks to send and receive hyper text transfer protocol messages, a domain server software suite application which is executed by said central process unit under the control of said operating system and providing for event-based execution of scripts, and a computer-readable record storage means accessible by said applications, scripts and tasks;

at least one computer-readable record disposed in said computer-readable record storage means, said computer-readable record providing an association of a virtual subdomain address to a real address; and a redirection script executable by said central processor unit, said redirection script's execution being invoked by said domain server software suite upon the event of receipt of a virtual subdomain address document request such that the redirection script accesses the computer-readable record, and said script redirects said request to said real address.

6. An Internet virtual subdomain name server for providing Internet address management for unregistered and unrecognized subdomains as set forth in claim 5 wherein said real address comprises a recognized and registered domain name.

7. An Internet virtual subdomain name server for providing Internet address management for unregistered and unrecognized subdomains as set forth in claim 5 wherein said real address comprises a subdirectory of a recognized and registered domain name.

8. An Internet virtual subdomain name server for providing Internet address management for unregistered and unrecognized subdomains as set forth in claim 5 wherein said domain server software suite further comprises an Apache Hyper Text Transfer Protocol Server suite.

9. An Internet virtual subdomain name server for providing Internet address management for unregistered and unrecognized subdomains as set forth in claim 8 wherein said redirection script comprises a Personal Home Page ("PHF") script.

10. An Internet virtual subdomain name server for providing Internet address management for unregistered and unrecognized subdomains as set forth in claim 5 wherein said central processor unit comprises an IBM-compatible personal computer system.

11. An Internet virtual subdomain name server for providing Internet address management for unregistered and unrecognized subdomains as set forth in claim 5 wherein said central processor unit comprises the Linux operating system.

12. An Internet virtual subdomain name server for providing Internet address management for unregistered and unrecognized subdomains as set forth in claim 5 wherein said computer-readable record comprises a computer-readable database.

* * * * *